United States Patent [19]

Tanaka

[11] Patent Number: 5,894,047
[45] Date of Patent: Apr. 13, 1999

[54] HEAT REFLECTING GLASS

[75] Inventor: Katsuto Tanaka, Matsusaka, Japan

[73] Assignee: Central Glass Company, Limited, Yamaguchi, Japan

[21] Appl. No.: 08/625,898

[22] Filed: Apr. 1, 1996

[30] Foreign Application Priority Data

Mar. 30, 1995 [JP] Japan .................. 7-073640

[51] Int. Cl.$^6$ .......................... B32B 7/00
[52] U.S. Cl. .............. 428/212; 428/216; 428/336; 428/428; 428/432; 428/697; 428/699; 428/701; 428/702; 359/359; 359/580; 359/582; 359/586; 359/589
[58] Field of Search .................. 428/212, 432, 428/697, 699, 701, 702, 216, 336, 428; 359/359, 580, 582, 586, 589

[56] References Cited

U.S. PATENT DOCUMENTS

| | | |
|---|---|---|
| 3,660,061 | 5/1972 | Donley et al. . |
| 4,971,843 | 11/1990 | Michelotti et al. ............. 428/432 |
| 5,168,003 | 12/1992 | Proscia ............................ 428/216 |

FOREIGN PATENT DOCUMENTS

| | | |
|---|---|---|
| 1117383 | 2/1992 | Canada . |
| 0 301 755 | 2/1989 | European Pat. Off. . |
| 0 507 236 | 10/1992 | European Pat. Off. . |
| 53-32806 | 9/1978 | Japan . |
| 64-70701 | 3/1989 | Japan . |
| 5-213630 | 8/1993 | Japan . |
| 6-192598 | 7/1994 | Japan . |
| 2288818 | 11/1995 | United Kingdom . |

OTHER PUBLICATIONS

H.K. Pulker, "Coatings on Glass", Thin Films Science and Technology, 6, Elsevier, 1984, pp. 359, 365-367.
JP-A-59 184744, Japan, vol. 009, No. 041, Feb. 21,1985, (abst.).
JP-A-03 164449, Japan, vol. 015, No. 403, Jul. 16, 1991 (abst.).

*Primary Examiner*—Archene Turner
*Attorney, Agent, or Firm*—Evenson, McKeown Edwards & Lenahan P.L.L.C.

[57] ABSTRACT

The invention relates to a heat reflecting glass pane. This glass pane has a transparent glass plate and a multilayer coating formed on one side of the glass plate. The multilayer coating includes a first heat-reflecting layer formed on a surface of the glass plate, and a second layer formed on the first layer. The first layer has a first refractive index from 2.0 to 3.5, a first extinction coefficient from 0.2 to 1.5, and a first thickness from 20 to 80 nm. The second layer has a second refractive index from 1.6 to 2.3, a second extinction coefficient not higher than 0.03, and a second thickness from 10 to 100 nm. The second refractive index is smaller than the first refractive index. The heat reflecting glass pane does not so much reduce the reflectance of a visible light incident on the glass plate from the uncoated side, but substantially reduces the reflection of a visible light incident on the second layer from the coated side.

6 Claims, No Drawings

HEAT REFLECTING GLASS

BACKGROUND OF THE INVENTION

1. Field of the Invention

The present invention relates to a heat reflecting glass pane with a multilayer coating formed on one side of the glass pane, for use in buildings or vehicles.

2. Description of the Prior Art

Heat reflecting glass panes have been used as window panes for buildings or vehicles, for the purpose of diminishing the direct sunlight or of providing occupants of the buildings or vehicles with privacy.

For example, Japanese Patent Examined Publication JP-B-Sho-53-32806 discloses a heat reflecting glass pane having thereon a heat reflecting layer made of a mixture of an aluminum oxide and at least one oxide of at least one metal selected from Co, Fe, Ni, Cr, Sn, Zn and Cu.

Japanese Patent Unexamined Publication JP-A-Hei-5-213630 discloses another heat reflecting glass pane having thereon a layer which is a spinel-type oxide polycrystalline film containing all of three elements of cobalt, iron and nickel. This film has a surface resistivity not smaller than $10^4$ $\Omega/\square$.

Japanese Patent Unexamined Publication JP-A-Hei-6-192598 discloses an ultraviolet absorbing glass having a heat reflecting capability. This glass has a glass substrate, and an ultraviolet absorbing film which is formed on the glass substrate and contains as a main component thereof at least one of zinc oxide, titanium oxide, and cerium oxide. This glass further has an interlayer film which is disposed between the glass substrate and the ultraviolet absorbing film and has an intermediate refractive index between that of the glass substrate and that of the ultraviolet absorbing film.

Japanese Patent Unexamined Publication JP-A-Sho-64-70701 discloses a transparent plate having a conductive reflection reducing multilayer film formed on a transparent substrate having a refractive index from 1.45 to 1.60. This multilayer film has a first metal film which is formed on the substrate, has a thickness of 2–6 nm, and is made of one metal selected from titanium, chromium, zirconium, molybdenum, a nickel-chromium alloy and a stainless steel containing Ni, Cr and Fe. This multilayer film further has a second high-refractive-index dielectric film which is formed on the first film, and has a refractive index from 1.90 to 2.50 and a thickness from 20 to 40 nm. This multilayer film still further has a third low-refractive-index dielectric film which is formed on the second film, and has a refractive index from 1.35 to 1.50 and a thickness from 70 to 120 nm.

SUMMARY OF THE INVENTION

It is an object of the present invention to provide a heat reflecting glass pane having a transparent glass plate and a coating formed on one side of the glass plate, which glass pane does not so much reduce the reflectance of a visible light incident on the glass plate from the uncoated side, but substantially reduces the reflectance of a visible light incident on the coating from the coated side.

According to the present invention, there is provided a heat reflecting glass pane having a transparent glass plate and a multilayer coating formed on one side of the glass plate, the multilayer coating comprising:

a first heat-reflecting layer formed on a surface of the glass plate, said first layer having a first refractive index from 2.0 to 3.5, a first extinction coefficient from 0.2 to 1.5, and a first thickness from 20 to 80 nm; and a second layer formed on said first layer, said second layer having a second refractive index from 1.6 to 2.3, a second extinction coefficient not higher than 0.03, and a second thickness from 10 to 100 nm, wherein said second refractive index is smaller than said first refractive index.

As stated above, the first heat-reflecting layer of the multilayer coating has a particular first large refractive index (2.0–3.5), a particular first large extinction coefficient (0.2–1.5), and a particular first thickness (20–80 nm). In contrast, the second layer of the multilayer coating has a particular second small refractive index (1.6–2.3), a particular second small extinction coefficient (not higher than 0.03), and a particular second thickness (10–100 nm). Furthermore, according to the invention, the second refractive index is smaller than the first refractive index.

When a heat reflecting glass pane according to the invention is used as a building window, the glass pane is arranged such that the multilayer coating's side is positioned on the side of the building interior and the glass plate's uncoated side is positioned on the side of the building exterior. Similarly, when it is used as an automobile's windshield, it is arranged such that the former is positioned on the side of the automobile's interior and the latter is positioned on the side of the automobile's exterior.

Due to the above-mentioned characteristics of the multilayer coating, a heat reflecting glass pane according to the invention is capable of not so much reducing the reflectance of a first visible light incident on the glass plate from the uncoated side, and further capable of substantially reducing the reflectance of a second visible light incident on the multilayer coating from the coated side, while the glass pane is capable of maintaining a good heat reflecting characteristic.

Due to the substantial reduction of the reflectance of the second visible light, if the glass pane is used as a window pane of a building, the reflection of the image of a fluorescent light or the like in the window pane becomes almost inappreciable to the occupants of the building. This is favorable for the comfort of the occupants. Furthermore, if the glass pane is used as a windshield of an automobile, the reflection of the image of the dashboard or the like in the windshield also becomes almost inappreciable to the driver and to the passengers of the automobile. This is favorable for the safety of driving and also for the comfort of the driver and the passengers.

Due to that the reflectance of the first visible light incident on the glass plate from the uncoated side is not reduced so much, the direct sunlight against the automobile's occupants and the building's occupants can be diminished, and they can have much privacy. Furthermore, a heat reflecting glass pane according to the invention is superior in durability.

DESCRIPTION OF THE PREFERRED EMBODIMENTS

As stated above, the second layer formed on the first heat-reflecting layer has a second refractive index from 1.6 to 2.3, a second extinction coefficient not higher than 0.03, and a second thickness from 10 to 100 nm. If the second thickness is greater than 100 nm, the reflection reduction diminishes, and the second layer may have cracks therein and becomes inferior in durability. If the second refractive index is less than 1.6 or more than 2.3, the reflection reduction diminishes, too.

Due to the above-mentioned characteristics of the second layer, when the glass pane is used as a windshield of an automobile, the reflection of the image of the dashboard or the like in the windshield becomes almost inappreciable to the driver and to the passengers of the automobile. This is favorable for the safety of driving and also for the comfort of the driver and the passengers. Furthermore, a second layer according to the invention does not interfere with the heat reflecting capability of the first layer.

Extinction coefficient is defined as the coefficient of imaginary unit in the following equation:

$$n'=n-ik$$

where n' is complex index of refraction, n is refractive index, i is imaginary unit, and k is extinction coefficient.

In the invention, the first heat-reflecting layer is preferably made of a first oxide of a particular transition metal which is at least one selected from Cr, Mn, Fe, Co, Ni, and Cu. This first oxide has a high reflectance and a high percent absorption for the visible light rays and for the solar radiation and is superior in durability. Thus, the direct sunlight can be diminished, and the occupants of building or automobile can have much privacy. Therefore, the first layer made of the first oxide is very effective as a heat reflecting layer.

The first heat-reflecting layer is prepared, for example, by a method comprising the sequential steps of: (a) providing a first compound in the form of solution or powder; (b) applying said first compound to the surface of the glass plate; and (c) pyrolyzing said first compound for transforming said first compound into said first oxide. The first compound is at least one selected from the group consisting of alkoxides of, acetylacetonates of, halides of, and carboxylates of the above-mentioned particular transition metal, and chelate compounds of these alkoxides, these halides and these carboxylates. With this method, the first layer of high durability can be produced with a low cost in an on-line method.

In the invention, the second layer is preferably made of a second oxide which is at least one selected from the group consisting of $TiO_2$, $ZrO_2$, $SiO_2$, $SnO_2$, $CeO_2$, $B_2O_3$, $Al_2O_3$, $Ta_2O_5$, $In_2O_3$ and ZnO. As stated above, the second layer has a second refractive index from 1.6 to 2.3. As to the second oxide, it is suitable to use at least one oxide selected from $SnO_2$ (about 1.9), $CeO_2$ (about 2.2), $Ta_2O_5$ (about 2.1), $In_2O_3$ (about 2.0) and ZnO (about 1.9), or to use a mixed oxide which is a combination of at least one of $TiO_2$ (about 2.3) and $ZrO_2$ (about 1.95), which are relatively high in refractive index, and at least one of $SiO_2$ (about 1.45), $Al_2O_3$ (about 1.65) and $B_2O_3$ (about 1.60) which are relatively low in refractive index, where the numbers in the parentheses are refractive indexes. The second layer is superior in durability.

In the invention, the second layer is prepared, for example, by a method comprising the sequential steps of: (a) providing a second compound in the form of solution; (b) applying said second compound to said first heat-reflecting layer; and (c) heating said second compound at a temperature not lower than 300° C. for transforming said second compound into said second oxide. The second compound is at least one selected from the group consisting of alkoxides of, acetylacetonates of, halides of, and carboxylates of an element, and chelate compounds of these alkoxides, these halides and these carboxylates. This element is one selected from the group consisting of Ti, Zr, Si, Sn, Ce, B, Al, Ta, In and Zn. With this method, the second layer can be easily formed through hydrolysis and dehydrocondensation. Of the above-mentioned second compounds, it is preferable to use an alkoxide of the element, because it is stable and capable of providing a uniform and durable layer which is particularly superior in reflectance reduction.

A glass plate used in the invention is not necessarily colorless, as long as it is transparent. The glass plate may be a color glass such as bluish, bronzy, grayish or greenish glass. As an automobile's windshield, a color glass such as bluish, bronzy or greenish glass is preferably used, and a greenish glass having an ultraviolet and/or infrared absorbing capability is more preferably used. The glass plate may be a single glass sheet, a heat reflecting glass, a multiple glass, or a laminated glass. It is optional to use a tempered or partly tempered glass plate. It is also possible to use an organic glass. Irrespective of the type of the glass, either of a flat glass plate or a curved glass plate can be used.

The following nonlimitative examples are illustrative of the present invention.

EXAMPLE 1

At the first step, a first heat-reflecting layer was formed on a glass plate as follows. At first, a clear soda-lime glass plate having widths of about 300 mm and a thickness of 3.5 mm was heated in a furnace at a temperature from 500 to 600° C. Immediately after the thus heated glass plated was taken out from the furnace, 30 g of a solution containing 14 wt % of cobalt acetylacetonate dissolved in dichloromethane was applied to the heated glass plate, by spending 20 seconds, with a spray gun, for the purpose of pyrolyzing cobalt acetylacetonate into cobalt oxide. The thickness and refractive index of the thus prepared first layer made of cobalt oxide were determined with an ellipsometer of Mizo-Jiri Kohgaku Co. The first layer had a thickness of about 40 nm, a refractive index of about 2.78, and an extinction coefficient of about 0.64. On the glass plate coated with the first layer, the transmittance and reflectance for the visible light (380–780 nm) and transmittance for solar radiation (340–1, 800 nm) were measured with a spectrophotometer (Type U 400 of Hitachi Ltd.), by the methods according to Japanese Industrial Standard (JIS) Z 8722 and JIS R 3106 or JIS Z 8701. The transmittance for the visible light was about 25.9%. The visible light reflectances from the uncoated glass plate's side and from the multilayer's side were respectively about 27.8% and about 38.6%. The transmittance for solar radiation was about 29.8%. The coated glass plate had a pale yellow-reddish reflection color tone.

At the second step, a second layer was formed on the first heat-reflecting layer by a sol-gel process as follows. At first, a mixture of a titanium alkoxide and a silicon alkoxide, having a ratio of the former to the latter of 70:30 on an oxide basis, was prepared. Then, this mixture, an organic solvent containing as a main component isopropyl alcohol, and a small amount of hydrochloric acid aqueous solution were mixed together. The resultant mixture was stirred for about 1 hr, and its solute (alkoxide) concentration was adjusted to about 3.47 wt % on an oxide basis. The thus obtained alkoxide solution had a viscosity of about 2.5 cP, and was stored in a glass bottle until its use. Then, the uncoated surface of the glass plate was masked with a masking tape. The masked glass plate was dipped into the above-prepared alkoxide solution and then drawn up from the alkoxide solution at a constant rate of about 3.5 mm/sec. Then, the masking tape was smoothly removed from the glass plate. Then, the coated glass plate was heated at about 250° C. for about 10 min to form a gel film on the first layer, and then heated at about 600° C. for about 5 min to transform the gel film into a second layer made of a mixture of $TiO_2$ and $SiO_2$. The thus formed second layer was found to have a thickness of about 60 nm, a refractive index of about 2.00 and an extinction coefficient of not greater than about 0.03, by the same measurement as that for the first layer.

The optical characteristics of the thus obtained glass plate having thereon the first and second layers were measured in the same manner as mentioned hereinabove. The transmittance of the visible light was about 40.7%. The visible light reflectances from the uncoated glass plate's side and from the multilayer coating's side were respectively about 23.4% and about 3.4%. The transmittance for solar radiation was about 40%. The coated glass plate had a blue purplish reflection color which is low in excitation purity.

The surface resistivity of the multilayer coating was measured with a high surface resistivity tester (HIRESTA HT-210 of Mitsubishi Yuka Co.) used for a specimen having a surface resistivity from about $10^5$ Ω/□ to about $10^5$ MΩ/□. By this measurement, it was found to have a sufficiently high value of not less than $10^5$ Ω/□. With this, the coated glass plate was proved to have a sufficient radio transmittance.

Wear resistance of the multilayer coating was examined by the Taber test in accordance with JIS K 6714. Before and after the Taber test, the haze value of the specimen was measured with a haze meter. With this, the multilayer coating was proved to have a sufficient resistance. Furthermore, chemical resistance test and other durability tests were conducted in accordance with JIS R 3221 and JIS R 3212, and the results of these tests were superior.

EXAMPLE 2

In this example, Example 1 was slightly modified as follows. At the first step, a first heat-reflecting layer was formed on a glass plate as follows. At first, a clear soda-lime glass plate (F13.5) having the same dimensions as those of the glass plate in Example 1 was heated in the same manner as in Example 1. Then, a solution containing a mixture of 56 parts by weight of cobalt acetylacetonate, 40 parts by weight of chromium acetylacetonate and 4 parts by weight of iron acetylacetonate, dissolved in dichloromethane, was applied to the glass plate, in the same manner as in Example 1, for the purpose of pyrolyzing the mixture into a mixture of cobalt oxide, chromium oxide and iron oxide. Then, the thickness and refractive index of the thus formed first layer were determined in the same manner as in Example 1. The first layer had a thickness of about 40 nm, a refractive index of about 2.66, and an extinction coefficient of about 0.43. The glass plate coated with the first layer was found to have a transmittance for the visible light of about 36.7%, visible light reflectances from the uncoated glass plate's side and from the multilayer's side of about 23.1% and about 32.4% respectively, and a transmittance for solar radiation of about 40%, by the same measurement as in Example 1. The coated glass plate had a pale yellow-reddish reflection color tone.

At the second step, a second layer was formed on the first heat-reflecting layer by a sol-gel process as follows. At first, a mixture of a zirconium alkoxide and a silicon alkoxide, having a ratio of the former to the latter of 80:20 on an oxide basis, was prepared. Then, using this mixture, an alkoxide solution was prepared in the same manner as in Example 1. The thus obtained alkoxide solution had a viscosity of about 3.1 cP. Then, the alkoxide solution was applied to the first layer in the same dipping method as in Example 1. Then, the coated glass plate was heated at about 260° C. for about 10 min to form a gel film on the first layer, and then heated at about 610° C. for about 5 min to transform the gel film into a second layer made of a mixture of $ZrO_2$ and $SiO_2$. The thus formed second layer was found to have a thickness of about 70 nm, a refractive index of about 1.80 and an extinction coefficient of not greater than about 0.03, by the same measurement as in Example 1.

The optical characteristics of the thus obtained glass plate having thereon the first and second layers were measured in the same manner as in Example 1. The transmittance of the visible light was about 52.4%. The visible light reflectances from the uncoated glass plate's side and from the multilayer coating's side were respectively about 18.0% and about 3.4%. The transmittance for solar radiation was about 48.4%. The coated glass plate had a blue purplish reflection color which is low in excitation purity.

The surface resistivity test, wear resistance test, chemical resistance test and other durability tests were conducted in the same manners as in Example 1. The results of all of these tests were superior.

EXAMPLE 3

In this example, Example 1 was slightly modified as follows. At the first step, a first heat-reflecting layer was formed on a glass plate as follows. At first, a green glass plate (MF13.5) having the same dimensions as those of the glass plate in Example 1 was heated in the same manner as in Example 1. Then, the same solution as that of Example 2 was applied to the glass plate in the same manner as in Example 1. The thickness and refractive index of the thus formed first layer were determined in the same manner as in Example 1. The first layer had a thickness of about 40 nm, a refractive index of about 2.66, and an extinction coefficient of about 0.43. The glass plate coated with the first layer was found to have a transmittance for the visible light of about 33.8%, visible light reflectances from the uncoated glass plate's side and from the multilayer's side of about 22.6% and about 34.9% respectively, and a transmittance for solar radiation of about 30.7%, by the same measurement as in Example 1.

At the second step, a second layer was formed on the first heat-reflecting layer by a sol-gel process as follows. At first, a mixture of a titanium alkoxide and a silicon alkoxide, having a ratio of the former to the latter of 54:46 on an oxide basis, was prepared. Then, using this mixture, an alkoxide solution was prepared in the same manner as in Example 1. The thus obtained alkoxide solution had a viscosity of about 2.8 cP. Then, the alkoxide solution was applied to the first layer in the same dipping method as in Example 1. Then, the coated glass plate was subjected to a two-step heat treatment in the same manner as in Example 1, to form a second layer made of a mixture of $TiO_2$ and $SiO_2$. The thus formed second layer was found to have a thickness of about 74 nm, a refractive index of about 1.80 and an extinction coefficient of not greater than about 0.03, by the same measurement as in Example 1.

The optical characteristics of the thus obtained glass plate having thereon the first and second layers were measured in the same manner as in Example 1. The transmittance of the visible light was about 50.1%. The visible light reflectances from the uncoated glass plate's side and from the multilayer coating's side were respectively about 12.4% and about 3.9%. The transmittance for solar radiation was about 37.1%. The coated glass plate had a blue purplish reflection color which is low in excitation purity.

The surface resistivity test, wear resistance test, chemical resistance test and other durability tests were conducted in the same manners as in Example 1. The results of all of these tests were superior.

What is claimed is:

1. A heat reflecting glass pane having a transparent glass plate and a multilayer coating formed on one side of the glass plate, the multilayer coating comprising:

a first heat-reflecting layer formed on a surface of the glass plate, said first layer having a first refractive index from 2.0 to 3.5, a first extinction coefficient from 0.2 to 1.5, a first thickness from 20 to 80 nm; and a second layer formed on said first layer, said second layer having a second refractive index from 1.6 to 2.3, a second extinction coefficient not higher than 0.03, and a second thickness from 10 to 100 nm, wherein said second refractive index is smaller than said first refractive index, and wherein said second layer comprises a second oxide which is at least one selected form the group consisting of $TiO_2$, $ZrO_2$, $SiO_2$, $CeO_2$, $B_2O_3$, $Al_2O_3$, $Ta_2O_5$, $In_2O_3$ and ZnO.

2. A heat reflecting glass pane according to claim 1, wherein said first heat-reflecting layer comprises a first oxide of a transition metal which is at least one selected from the group consisting of Cr, Mn, Fe, Co, Ni, and Cu.

3. A heat reflecting glass pane according to claim 2, wherein said first heat-reflecting layer is prepared by a method comprising the sequential steps of:

(a) providing a first compound in the form of solution or powder, said first compound being at least one selected from the group consisting of alkoxides of said transition metal, acetylacetonates of said transition metal, halides of said transition metal, carboxylates of said transition metal, and chelate compounds of said alkoxides, said halides and said carboxylates;

(b) applying said first compound to the surface of the glass plate; and (c) pyrolyzing said first compound for transforming said first compound into said first oxide.

4. A heat reflecting glass pane according to claim 1, wherein said second layer is prepared by a method comprising the sequential steps of:

(a) providing a second compound in the form of solution, said second compound being at least one selected from the group consisting of alkoxides of an element, acetylacetonates of said element, halides of said element, carboxylates of said element, and chelate compounds of said alkoxides, said halides and said carboxylates, said element being one selected from the group consisting of Ti, Zr, Si, Sn, Ce, B, Al, Ta, In and Zn;

(b) applying said second compound to said first heat-reflecting layer; and (c) heating said second compound at a temperature not lower than 300° C. for transforming said second compound into said second oxide.

5. A heat reflecting glass pane according to claim 1, wherein the multilayer coating consists essentially of:

a first heat-reflecting layer formed on a surface of the glass plate, said first layer having a refractive index from 2.0 to 3.5, an extinction coefficient from 0.2 to 1.5, and a thickness of from 20 to 80 nm; and a second layer formed on said first layer, said second layer having a second refractive index from 1.6 to 2.3, an extinction coefficient not higher than 0.03, and a thickness of from 10 to 100 nm, wherein the refractive index of said second layer is smaller than the refractive index of said first layer.

6. A heat reflecting glass pane according to claim 1, wherein said second oxide s at least selected from the group consisting of $TiO_2$, $ZrO_2$, $SiO_2$, $CeO_2$, $B_2O_3$, $Al_2O_3$ and $Ta_2O_5$.

* * * * *